US009127930B2

(12) United States Patent
Yang et al.

(10) Patent No.: US 9,127,930 B2
(45) Date of Patent: Sep. 8, 2015

(54) DISTANCE MEASUREMENT SYSTEM AND METHOD

(75) Inventors: Shu-Sian Yang, Hsinchu (TW);
Ren-Hau Gu, Hsinchu (TW);
Hsin-Chia Chen, Hsinchu (TW);
Sen-Huang Huang, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 678 days.

(21) Appl. No.: 13/224,481

(22) Filed: Sep. 2, 2011

(65) Prior Publication Data

US 2012/0057023 A1    Mar. 8, 2012

(30) Foreign Application Priority Data

Sep. 3, 2010  (TW) .............................. 099129975 A

(51) Int. Cl.
*H04N 7/18* (2006.01)
*G01B 11/02* (2006.01)
*G01S 17/46* (2006.01)

(52) U.S. Cl.
CPC ............... *G01B 11/026* (2013.01); *G01S 17/46* (2013.01)

(58) Field of Classification Search
CPC ...................................................... G01B 11/25
USPC ................................................. 348/140, 136
See application file for complete search history.

(56) References Cited

U.S. PATENT DOCUMENTS

| | | | | |
|---|---|---|---|---|
| 5,969,753 A * | 10/1999 | Robinson | ...................... | 348/130 |
| 6,188,482 B1 * | 2/2001 | Cloud | .......................... | 356/491 |
| 8,400,494 B2 * | 3/2013 | Zalevsky et al. | ................ | 348/46 |
| 8,982,182 B2 * | 3/2015 | Shpunt et al. | .................... | 348/42 |
| 2004/0114154 A1 | 6/2004 | Luetche et al. | | |
| 2005/0190157 A1 * | 9/2005 | Oliver et al. | ................... | 345/166 |
| 2006/0044546 A1 | 3/2006 | Lewin et al. | | |
| 2006/0072914 A1 | 4/2006 | Arai et al. | | |
| 2007/0139659 A1 * | 6/2007 | Hwang et al. | .................. | 356/614 |
| 2007/0216894 A1 * | 9/2007 | Garcia et al. | ................. | 356/4.01 |
| 2008/0106746 A1 * | 5/2008 | Shpunt et al. | .................. | 356/610 |
| 2008/0212176 A1 * | 9/2008 | Baun et al. | ..................... | 359/429 |
| 2010/0118123 A1 * | 5/2010 | Freedman et al. | .............. | 348/46 |
| 2010/0177164 A1 * | 7/2010 | Zalevsky et al. | ................ | 348/46 |
| 2011/0013002 A1 * | 1/2011 | Thompson et al. | ............. | 348/77 |
| 2011/0170767 A1 * | 7/2011 | Lemonde et al. | ............. | 382/154 |

FOREIGN PATENT DOCUMENTS

| | | | | |
|---|---|---|---|---|
| JP | 2007271549 | 10/2007 | | |
| WO | WO 2004075040 A1 * | 9/2004 | .............. | G06F 3/033 |
| WO | 2008155961 | 12/2008 | | |

OTHER PUBLICATIONS

Garcia, Zalevsky, Garcia-Martinez, Ferreira, Teicher, and Beiderman. "Projection of Speckle Patterns for 3D Sensing". 2008 IOP PUblishing Ltd. Conference Series 139.*

(Continued)

*Primary Examiner* — Jeremaiah C Hallenbeck-Huber
(74) *Attorney, Agent, or Firm* — WPAT, P.C.; Justin King

(57) ABSTRACT

A distance measurement method comprising: projecting a light beam having a speckle pattern to at least one reference plane to show a plurality of images with the speckle pattern on the at least one reference plane. The speckle pattern has a plurality of speckles, so as to capture the image with the speckle pattern on the reference plane to obtain a plurality of reference image information. When the object enters the area illuminated by a light source module, an image with the speckle pattern on a surface of an object is captured to obtain an object image information. Then, a plurality of brightness relationships among each of the speckles with adjacent speckles rounding each speckle are computed according to the reference image and the object image information to obtain relative brightness information of each speckle, which is used to compute position of the object.

12 Claims, 12 Drawing Sheets

(56) References Cited

OTHER PUBLICATIONS

Osamu, Matoba; T. Sawasaki; K. Nakajima; K. Nitta; "Optical Identification System of Three-Dimensional Random Phase Object by Use of Speckle Patterns in Propogation Distances"; Sep. 6, 2007; Journal of Physics: Conference Series; vol. 77; available at http://iopscience.iop.org/1742-6596/77/1/012009.*

J. Garcia; Z. Zalevsky; P. Garcia-Martinez; C. Ferreira; M. Teicher; Y. Beiderman; "Projection of Speckle Patterns for 3D Sensing"; Dec. 11, 2008; Journal of Physics: Conference Series; vol. 139; No. 1; available at http://iopscience.iop.org/1742-6596/139/1/012026.*

\* cited by examiner

DISTANCE MEASUREMENT SYSTEM AND METHOD

CROSS-REFERENCE TO RELATED APPLICATION

This application claims the priority benefit of Taiwan application serial no. 099129975, filed on Sep. 3, 2010. The entirety of the above-mentioned patent application is incorporated herein by reference and made a part of this specification.

FIELD OF THE INVENTION

The present invention relates to a distance measurement technology, and more particularly to a three-dimension distance measurement technology

BACKGROUND OF THE INVENTION

Currently, distance measurement instrument can be divided into contact type and non-contact type. The contact type distance measurement instrument generally uses a traditional distance measurement technology, such as a coordinate measuring machine (CMM). Although the contact type distance measurement technology is quite accurate, because the object must be contacted, which may lead to damage to the object by a probe of the distance measurement instrument. Therefore, the contact type distance measurement instrument does not apply to the object with high cost.

Compared with the traditional contact type distance measurement instrument, operation frequency of the non-contact type distance measurement instrument may be higher than million frequencies, so it has been used in many fields. Non-contact type distance measurement technology can be divided into active type and passive type. The active non-contact type distance measurement technology projects an energy wave to the object and then calculates the distance between the object and the reference point according to reflection of the energy wave. Common energy wave includes visible light, high-energy light beam, ultrasound, and X-ray.

SUMMARY OF THE INVENTION

Accordingly, the present invention provides a distance measurement system and a distance measurement method, which can measure a position of an object using a non-contact method.

In addition, the present invention further provides a storage media having a processing software, for dealing with the information in a distance measurement system and analyzing a position of an object.

A distance measurement system provided by the present invention comprises more than one reference plane, a light source module, an image capture device, and a processing module. The light source module projects a light beam having a speckle pattern to the reference planes and an object, so as to show a plurality of images with the speckle pattern on the reference plane and a surface of the object facing to the light source module. Wherein, the speckle pattern has a plurality of speckles. Therefore, the image capture device can capture the images with the speckle pattern shown on the reference planes for generating reference image information, and capture the image with the speckle pattern shown on the surface of the object for generating object image information. Then, the processing module calculates brightness relationships among each of speckles with adjacent speckles of each speckle in each reference image information and the object image information, so as to obtain the relative brightness information of each speckle. Therefore, the processing module could calculate the position of the object according to the relative brightness information.

From another viewpoint, a distance measurement method provided by the present invention comprises: projecting a light beam having a speckle pattern to more than one reference plane, so as to show a plurality of images with the speckle pattern on the at least one reference plane. The speckle pattern has a plurality of speckles. So, the invention may capture the image with the speckle pattern on the reference plane to obtain a plurality of reference image information. When the object enters the area illuminated by a light source module (such as a planar light source), an image with the speckle pattern on a surface of an object facing to the planar light source is captured to obtain an object image information. Then, a plurality of brightness relationships among each of the speckles with adjacent speckles rounding each speckle are calculated according to the reference image information and the object image information, so as to obtain relative brightness information of each speckle. After that, position of the object is calculated according to the relative brightness information.

In one embodiment of the present invention, the step of obtaining relative brightness information of each speckle comprises: comparing brightness of each of speckles and adjacent speckles rounding each speckle, wherein each of adjacent speckles is corresponding to one of a plurality of regional binary codes respectively. Then, applying 1 to one of the regional binary codes when corresponding adjacent speckle is brighter than corresponding speckle, and applying 0 to one of the regional binary codes when corresponding adjacent speckle is darker than corresponding speckle. The regional binary codes of the adjacent speckles rounding each speckle are stored as the relative brightness information of each speckle.

In another embodiment of the present invention, the step of obtaining relative brightness information of each speckle comprises: calculating brightness of each of speckles and adjacent speckles rounding each speckle, and using a predetermined formula to calculate the brightness of each of the speckles and adjacent speckles rounding each speckle, so as to obtain the relative brightness information of each speckle.

From another viewpoint, a storage media provided by the present invention has a processing software which can carry out the following the steps: receiving at least one reference image information from at least one image shown on at least one reference plane by reflecting a planner light source with a speckle pattern, wherein the speckle pattern has a plurality of speckles. In addition, receiving image information from an image shown on a surface of an object facing to the planar light source. Then calculating brightness relationships among each of speckles and adjacent speckles rounding each speckle in the least one reference image information and the object image information, so as to obtain relative brightness information of each speckle. At last, calculating position of the object according to the relative brightness information.

Because the invention measures the distance according to images with speckle pattern projected on the reference plane and the object, and three-dimension distance measurement technology can be achieved. In addition, the invention calculates position of the object according to relative brightness information of each speckle, the invention can obtain accurate position of the object.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
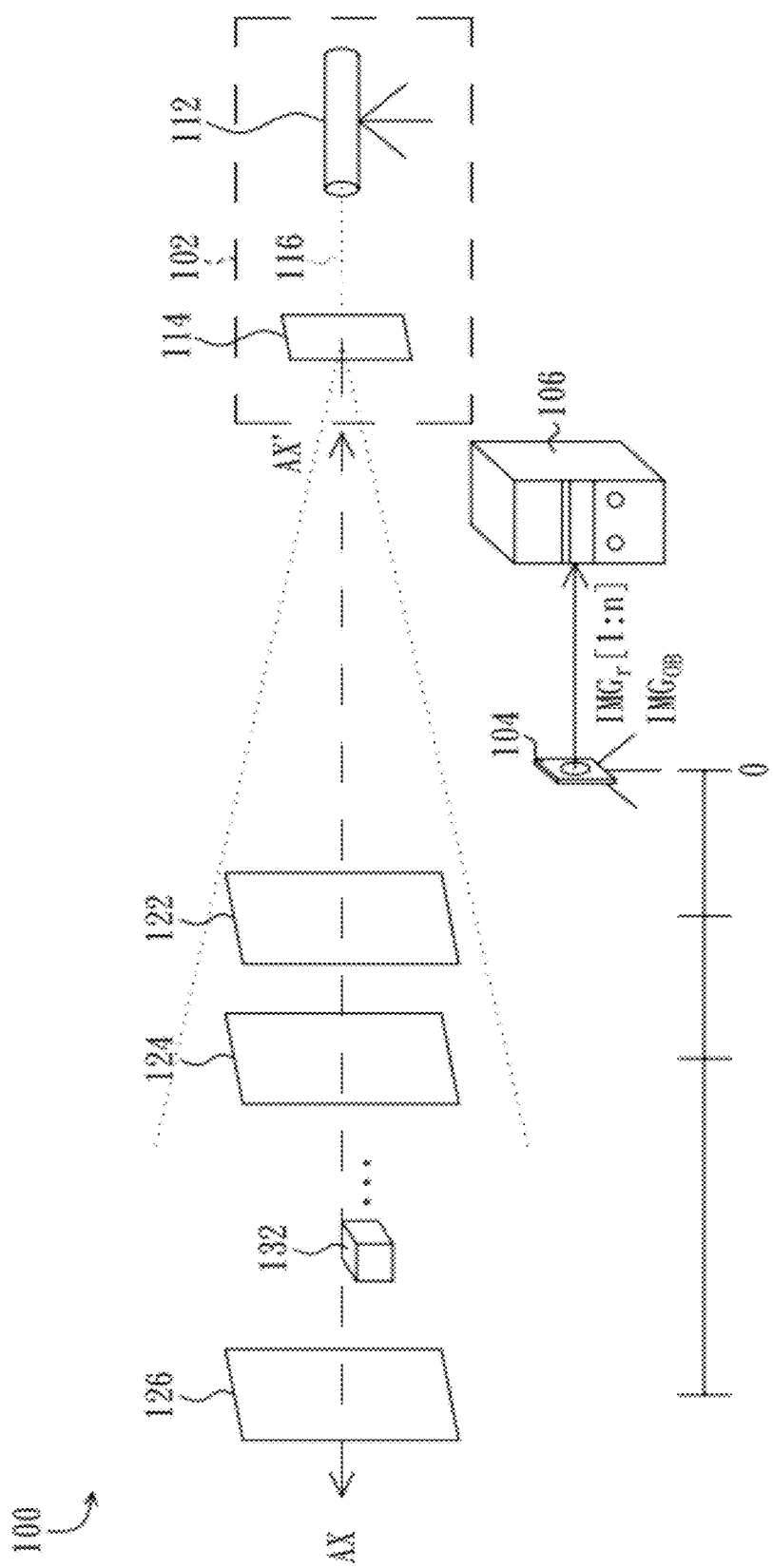
FIG. 1 shows a schematic view of a distance measurement system in accordance with a first embodiment of the invention.
Figure 2A:
FIGS. 2A to 2D show images with the speckle pattern shown on the reference plane whose distance between a reference point are 70, 75, 80, and 85 centimeters, respectively.
Figure 2B:
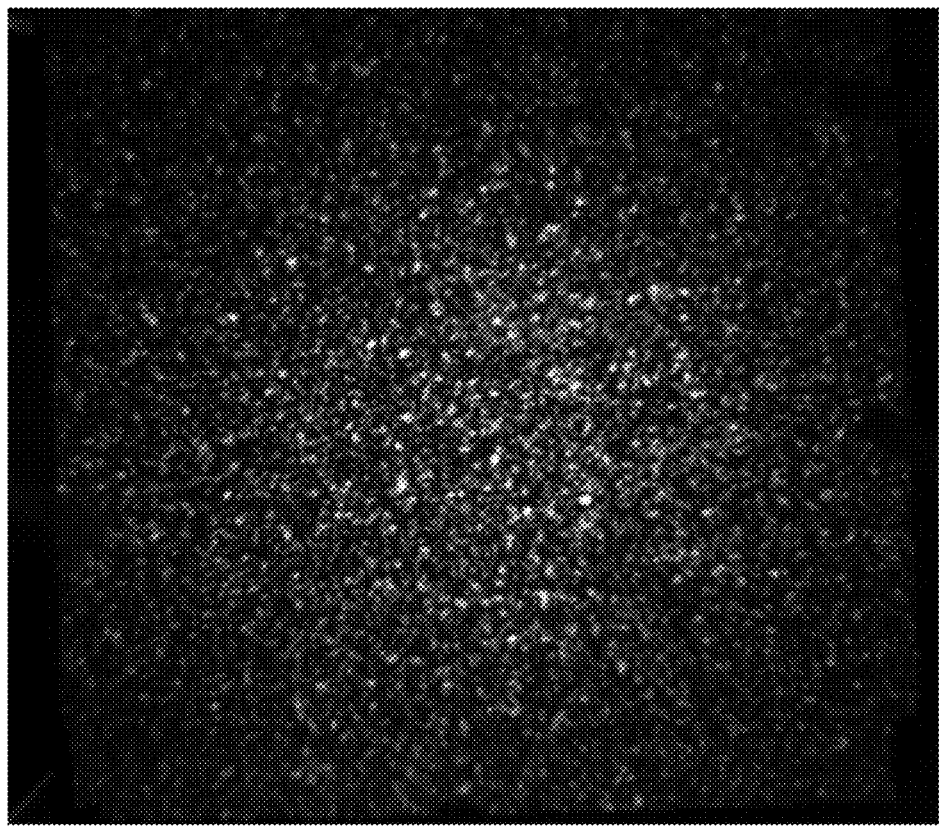
Figure 2C:
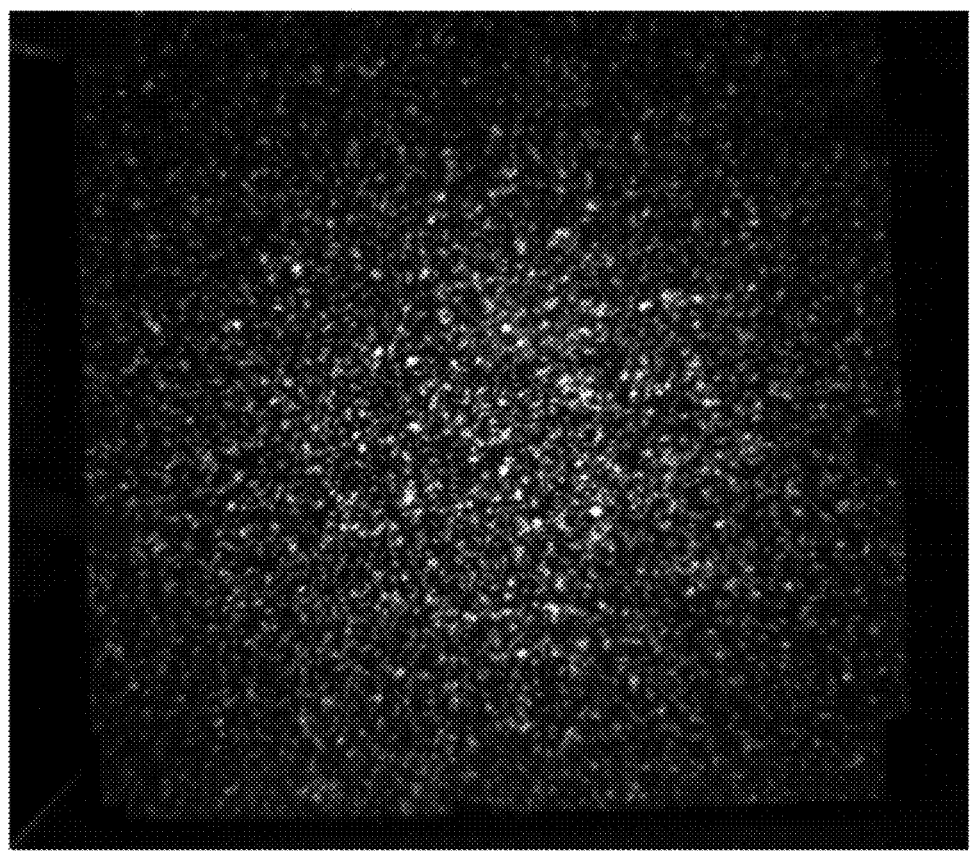
Figure 2D:
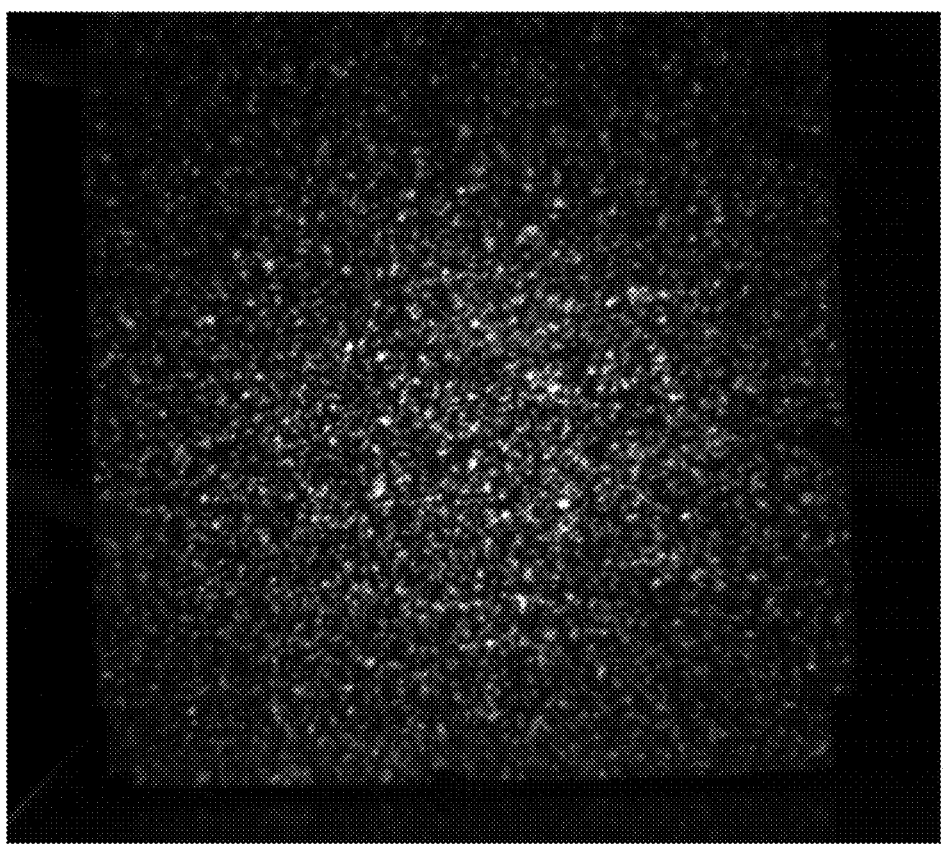

FIG. 1 shows a schematic view of a distance measurement system in accordance with a first embodiment of the invention. Referring to FIG. 1, the distance measurement system 100 provided by this embodiment includes a light source module 102, an image capture device 104, and a processing module 106. The light source module 102 may be a planar light source, and be suitable of projecting a light beam having a speckle pattern to a detection range. In addition, the image capture device 104 can be coupled to the processing module 106.

In this embodiment, the light source module 102 includes a laser light source 112 and a diffusion component 114. The laser light source 112 may use gas laser, such as helium neon laser, or semiconductor laser. In addition, the diffusion component 114 may be a diffusion plate, a frosted glass, or other diffraction components. When the laser beam 116 emitted from the laser light source 112 is transmitted to the diffusion component 114, diffraction and interference phenomenon may occur in the diffuse component 114 so that the light source module 102 could be the planar light source providing the light beam having the speckle pattern.

Referring to FIG. 1 again, in this embodiment, the light source module 102 may project the speckle pattern to more than one reference plane. In this embodiment, the distance measurement system 100 includes reference planes 122, 124, and 126. In addition, in some embodiments, these reference planes 122, 124, and 126 are parallel each other in a visible scope. In some embodiments, the distance between each reference plane and next reference plane is the same, but the invention is not limited to the above-mentioned embodiments. In addition, in this embodiment, the reference planes 122, 124, and 126 are substantially vertical to the laser beam 116, that is, an optical axis AX-AX' produced by the light source module 102. In addition, the reference planes 122, 124, and 126 may be on the optical axis AX-AX' at the same time, or at least one of the reference planes 122, 124, and 126 may be not on the optical axis AX-AX' at the same time.

When the speckle patterns are projected to these reference planes, each reference plane reflects the light beam having the pattern provided from the planar light source and show images with the speckle patterns as shown in FIGS. 2A-2D. FIGS. 2A-2D show images with the speckle patterns shown on the reference plane whose distance between a reference point are 70, 75, 80, and 85 centimeters, respectively. Seen from FIGS. 2A-2D, the speckle pattern has a plurality of speckles. At this time, the image capture device 104 captures images with the speckle patterns shown on each reference planes 122, 124, and 126, and generates at least one reference image information IMGr [1:n] to the processing module 106, where n is a positive integer equal to or greater than number 1. In this embodiment, the image capture device 104 may be a camera or a charge coupling device. In addition, the processing module 106 may be a computer system or a storage media which has a processing software suitable for analyzing a position of an object.

In some embodiments, the image capture device 104 may be set at position of the reference point O, and one side of the optical axis AX-AX'. From FIGS. 2A-2D, positions of each speckle on different reference planes are different. In order to determine position of each speckle, brightness of each speckle on different reference planes could be used as reference in this embodiment. That is, when the speckle is near to the optical axis AX-AX', the speckle is brighter. On the contrary, when the speckle is gradually far from the optical axis AX-AX' with different reference planes, the brightness of the speckle decreases. By measuring brightness of each speckle on each reference plane, position of each speckle on different reference planes can be obtained.

Due to environment light affects the brightness of the speckles, and the processing module 106 will wrongly judge the position of the object. Therefore, in this embodiment, when the processing module 106 receives the reference image information IMGr [1:n], the brightness relationship among each of the speckles with adjacent speckles rounding each speckle in each reference image information IMGr [1:n] can be calculated to obtain the relative brightness information of each of the speckles.

Figure 3A:
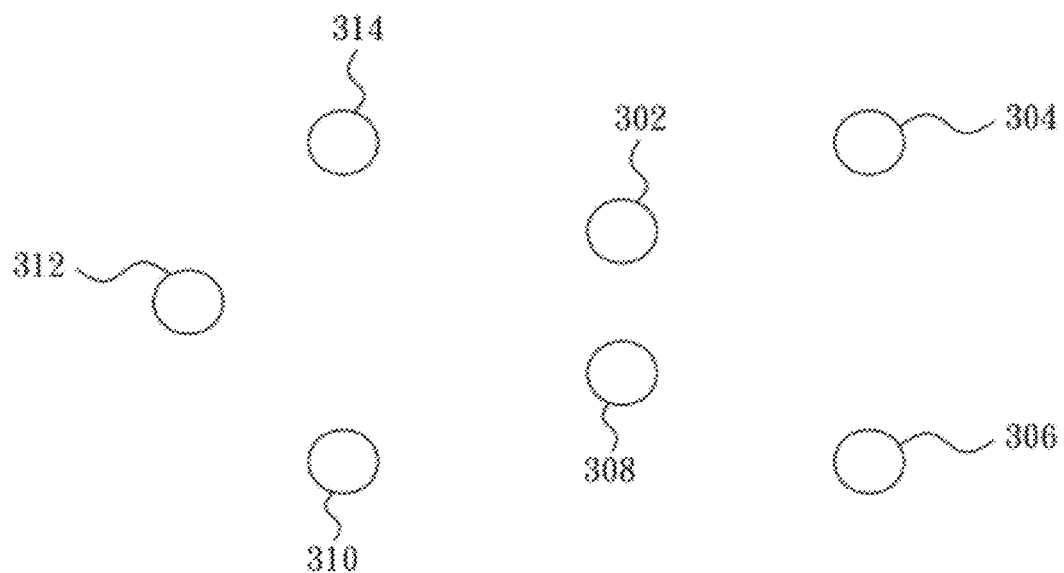
FIG. 3A shows a schematic view of distribution of a plurality of speckles in image information.

FIG. 3A shows a schematic view of distribution of a plurality of speckles in image information. In FIG. 3A, the speckle 302 is a target speckle, and the speckles 304, 306, 308, 310, 312, and 314 are adjacent speckles rounding the target speckle 302. Referring to FIGS. 1 and 3A together, in this embodiment, the processing module 106 will correspond each of the adjacent speckles 304, 306, 308, 310, 312, and 314 rounding the target speckle 302 to one of a plurality of regional binary codes, respectively. When the processing module 106 judges one of the adjacent speckles 304, 306, 308, 310, 312, and 314 is brighter than the target speckle 302, one of the corresponding regional binary code is applied 1. On the contrary, when one of the adjacent speckles 304, 306, 308, 310, 312, and 314 is darker than the target speckle 302, one of the corresponding regional binary codes is applied 0.

Figure 3B:
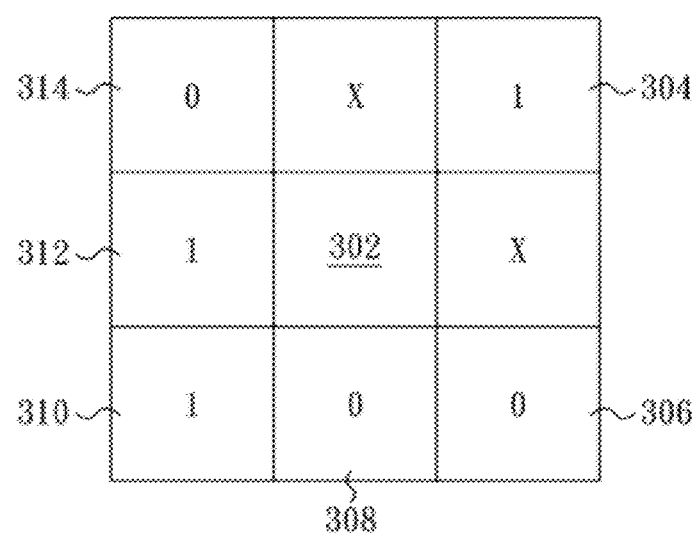
FIG. 3B shows a schematic view of a kind of regional binary code format in accordance with a first embodiment of the invention.

Thus, the processing module 106 will obtain a relative brightness information as shown in FIG. 3B, and stores it.

In FIG. 3B, a kind of regional binary code format is shown. The target speckle 302 is in the central position of the format, and speckles 304, 306, 308, 310, 312, and 314 are in other positions. Although FIG. 3B shows a relative brightness information format, the invention is not limited to this format.

In other embodiments, the processing module 106 can calculate brightness of each of speckles from one of the reference image information IMGr [1:n]. Then, according to a predetermined formula, the processing module 106 calculates brightness of each of the speckles and adjacent speckles rounding each speckle, so as to obtain relative brightness information of each speckle. In this embodiment, the predetermined formula may be as follows:

$$\frac{B_{Curr}}{B_{Curr} + B_{Avg}}$$

Where, $B_{Curr}$ is brightness of each speckle, and $B_{Avg}$ is average of brightness of each speckle and adjacent speckles rounding each speckle.

Figure 4:
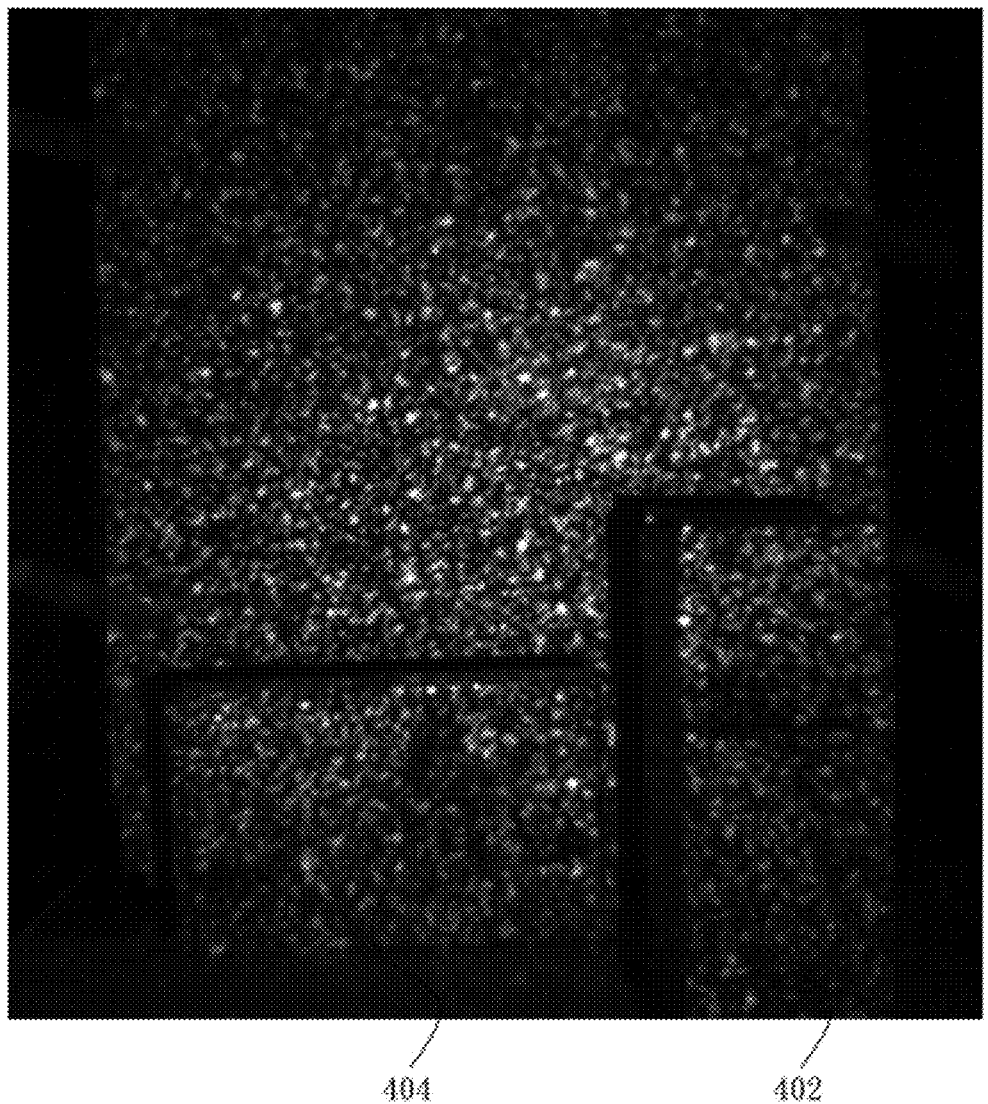
FIG. 4 shows a schematic view of the images with speckle pattern shown on the surface of the object in accordance with an embodiment of the present invention.

Please referring to FIG. 1 again, when an object 132 enters the area illuminated by the light beam provided from the light source module 102 (such as the planar light source mentioned above), the surface of the object 132 facing the light source will reflect the light beam to show image with the speckle pattern as shown in FIG. 4. FIG. 4 shows a schematic view of the image with speckle pattern shown on the surface of the object in accordance with an embodiment of the present invention. In FIG. 4, images in the area 402 and 404 are images with the speckle pattern shown on the surface of the object 132 facing the planar light source. At this time, the image capture device 104 will capture images with the speckle pattern shown on the object 132, and produce object image information IMGOB to the processing module 106.

Figure 5:
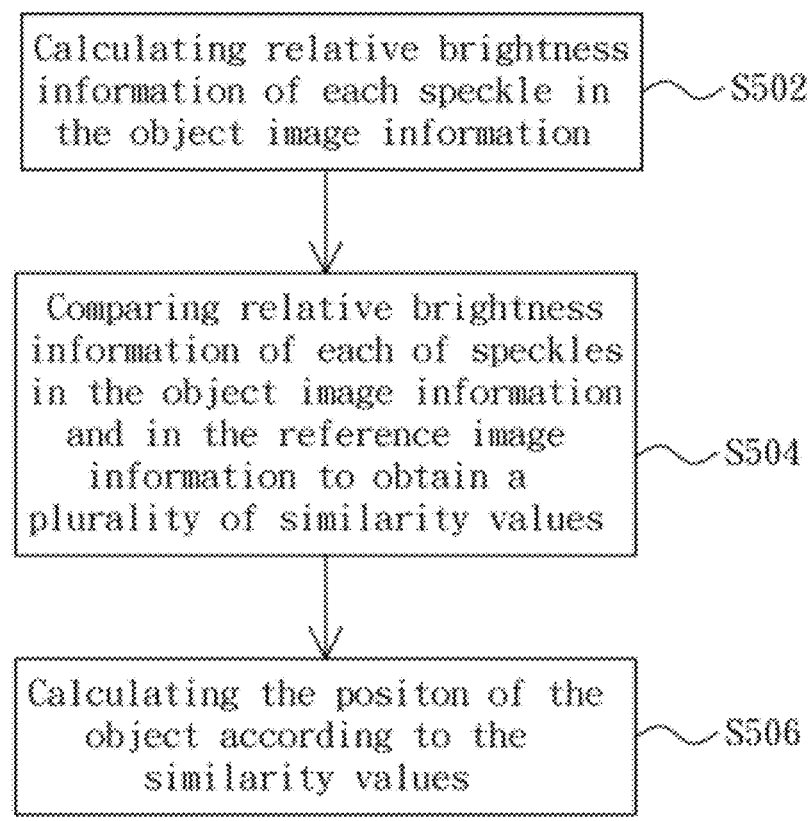
FIG. 5 shows a flow chart of operation step of the processing module in accordance with the first embodiment of the present invention.

FIG. 5 shows a flow chart of operation step of the processing module in accordance with the first embodiment of the present invention. Referring to FIGS. 1 and 5 together, when the processing module 106 obtains the object image information IMGOB, in step S502, calculating relative brightness information of each speckle in the object image information IMGOB. Then, in step S504, comparing relative brightness information of each of speckles in the object image information IMGOB and in the reference image information IMGr [1:n], so as to obtain a plurality of similarity values. Thus, in step S506, the processing module 106 calculates the position of the object according to the similarity values.

Figure 6:
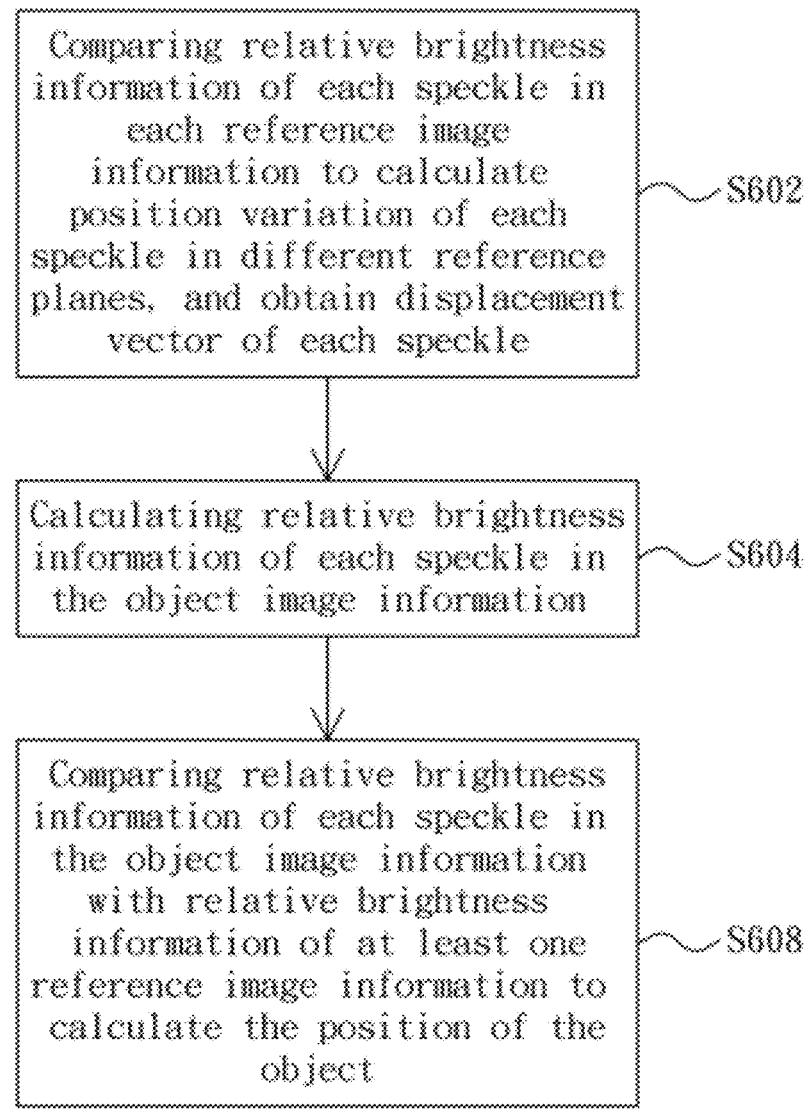
FIG. 6 shows a flow chart of operation step of the processing module in accordance with the second embodiment of the present invention.

FIG. 6 shows a flow chart of operation step of the processing module in accordance with the second embodiment of the present invention. Referring to FIGS. 1 and 6 together, in step S602, the processing module 106 compares relative brightness information of each speckle in each reference image information IMGr [1:n], so as to calculate position variation of each speckle in different reference planes, and obtain at least one displacement vector of each speckle. Then, when the processing module 106 receives the object image information IMGOB, in step S604, calculating relative brightness information of each speckle in the object image information IMGOB. Thus, in step S608, the processing module 106 compares relative brightness information of each speckle in the object image information IMGOB with relative brightness information of at least one of reference image information IMGr [1:n], so as to calculate the position of the object.

One skill in the art could know that the above description in FIGS. 5 and 6 can be implemented by a processing software. In some embodiment, the processing software can save in a storage media, such as a USB device, an optical storage media, a HDD or an external HDD etc.

Figure 7:
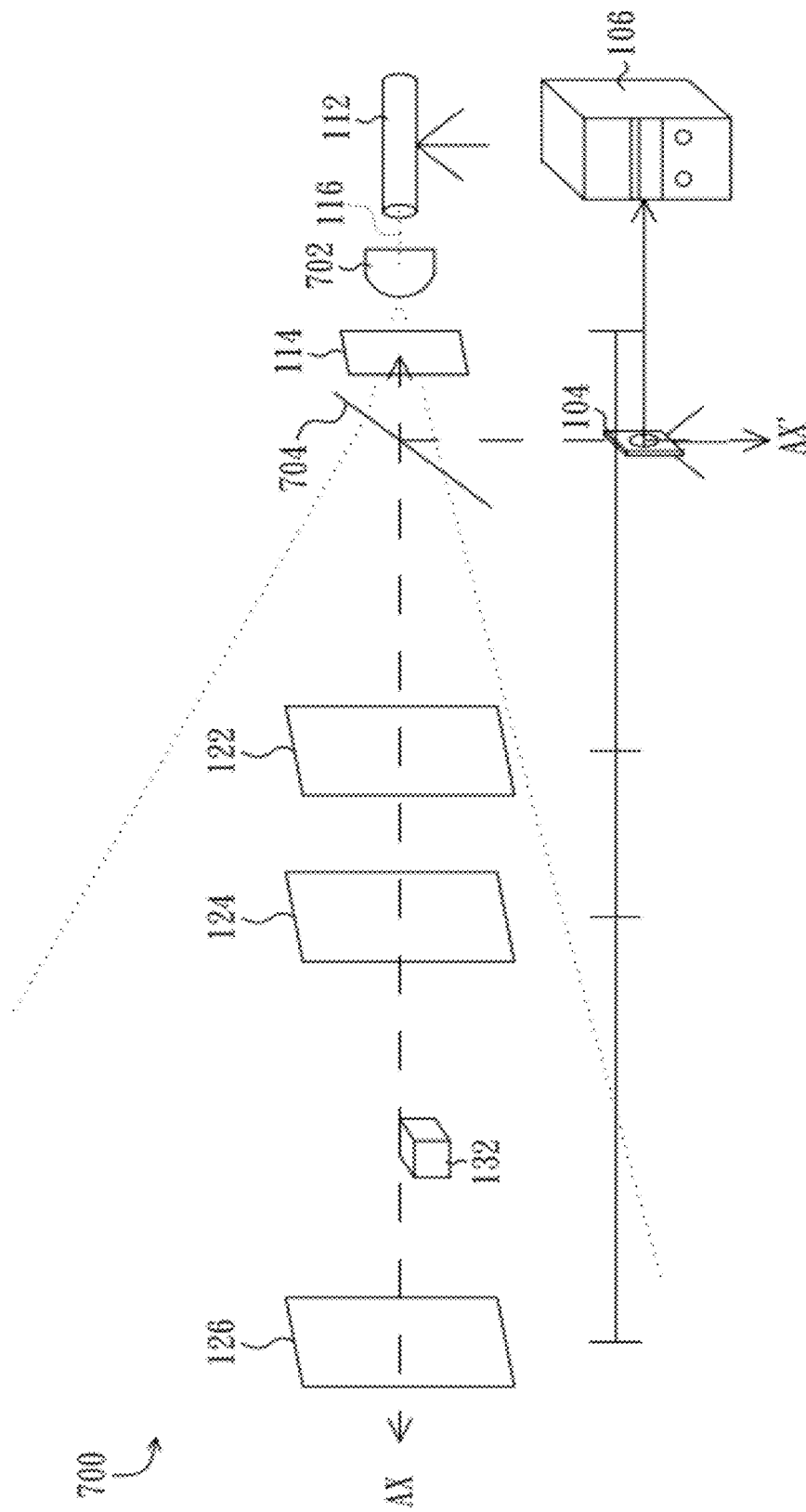
FIG. 7 shows a schematic view of a distance measurement system in accordance with a second embodiment of the invention.

FIG. 7 shows a schematic view of a distance measurement system in accordance with a second embodiment of the invention. Referring to FIG. 7, in the first embodiment, the image capture device 104 is placed at one side of the optical axis AX-AX', and between the laser light source 112 and the reference plane 122. However, in this provided distance measurement system 700, lens center of the image capture device 104 aims at the optical axis AX-AX'. In addition, in this embodiment, a lens 702 is set between the laser light source 112 and the diffusion component 114. The laser beam 116 would diffuse when passing through the lens 702, then the laser beam 116 arrives at the diffusion component 114. But between the diffusion component 114 and the reference plane 122, a spectral component 704 is configured. Therefore, light reflected by the reference planes 122, 124, 126 and the object 132 will be sent to the image capture device 104 by the spectral component 704. Thus, lens center of the image capture device 104 can aim at the optical axis AX-AX'.

Figure 8:
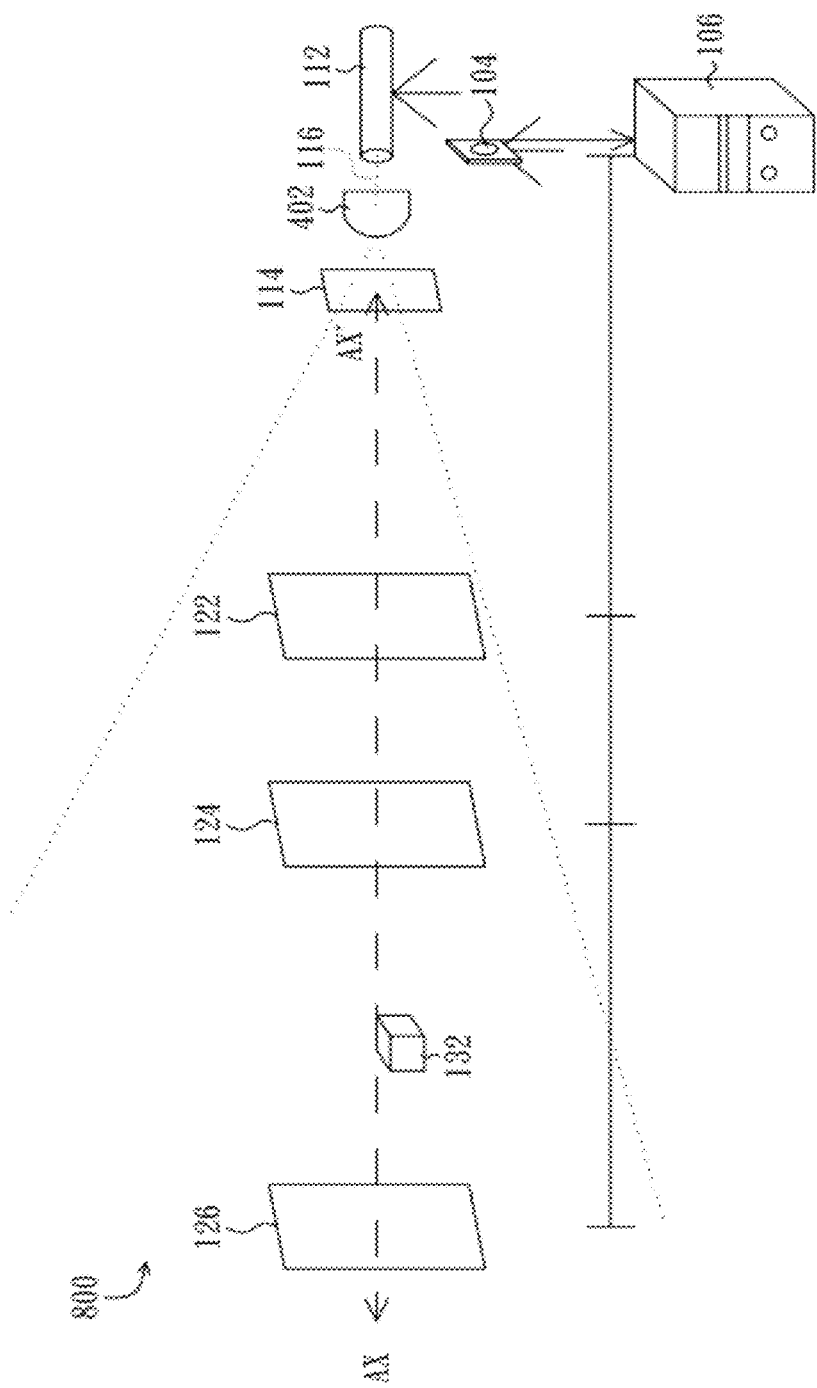
FIG. 8 shows a schematic view of a distance measurement system in accordance with a third embodiment of the invention.

FIG. 8 shows a schematic view of a distance measurement system in accordance with a third embodiment of the invention. Referring to FIG. 8, in this provided distance measurement system 800, the image capture device 104 can be placed on the corresponding position to the laser light source 112. And the rest devices are set as above-mentioned.

Figure 9:
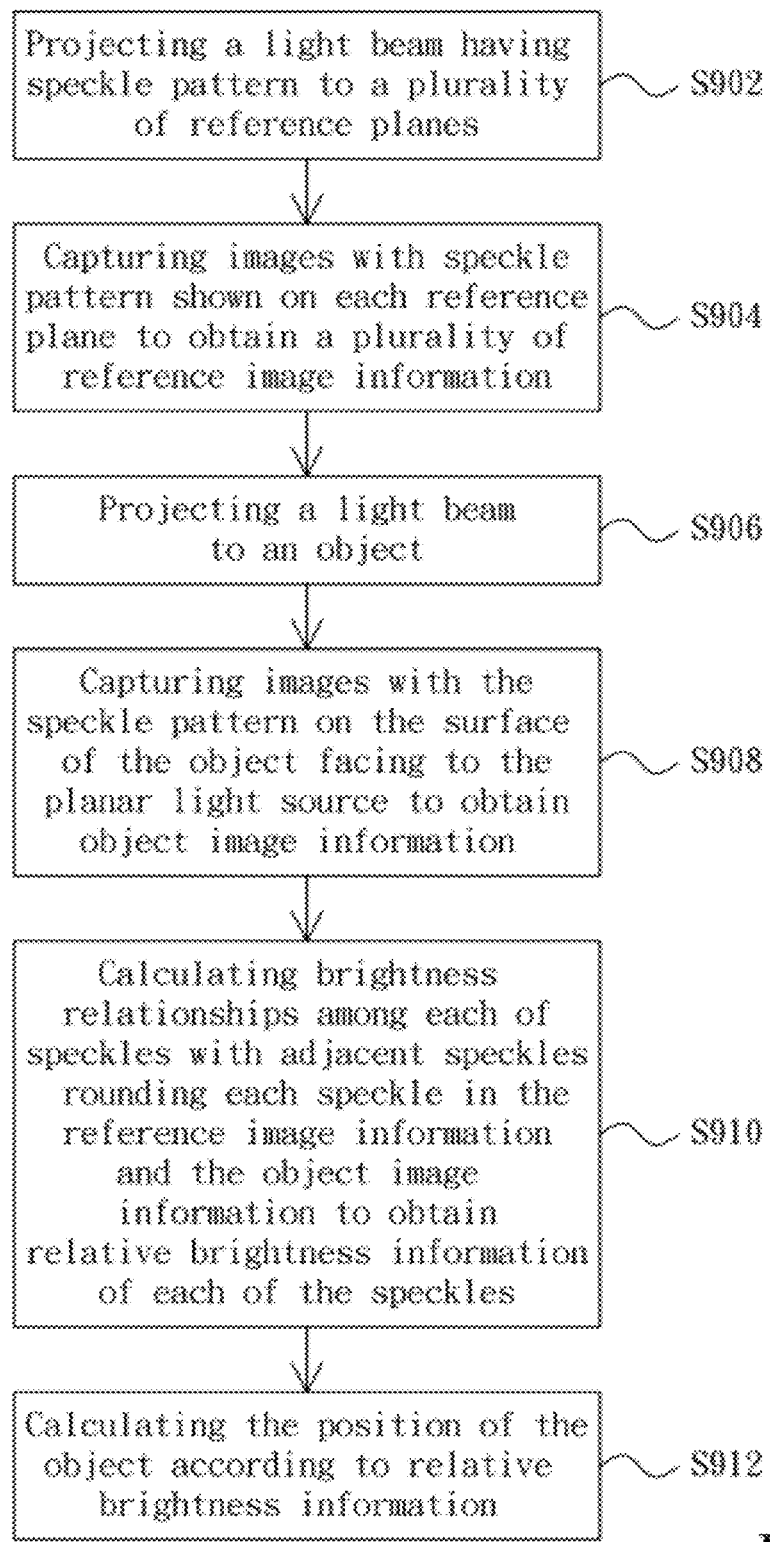
FIG. 9 shows a flow chart of a distance measurement method in accordance with an embodiment of the present invention.

FIG. 9 shows a flow chart of a distance measurement method in accordance with an embodiment of the present invention. Referring to FIG. 9, in step S902, projecting a light beam having speckle pattern to a plurality of reference planes. Then, in step S904, capturing images with speckle pattern shown on each reference plane to obtain a plurality of reference image information. In addition, in this embodiment, as step S906 mentioned, projecting a light beam provided from a planar light source to an object, and in step S908, capturing images with the speckle pattern on the surface of the object facing to the planar light source to obtain object image information.

At this time, in step S910, calculating brightness relationships among each of speckles with adjacent speckles rounding each speckle in the reference image information and the object image information to obtain relative brightness information of each of the speckles. Thus, in step S912, calculating the position of the object according to the relative brightness information.

In summary, because the invention calculates position of the object according to relative brightness information, the invention can exclude affection of the environment light, and obtain accurate position of the object.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A distance measurement system, comprising:
   at least one reference plane;
   a light source module, providing a light beam having a speckle pattern to the at least one reference plane and an object, so as to show a plurality of images having the speckle pattern on the at least one reference plane and a surface of the object, wherein the speckle pattern has a plurality of speckles;

an image capture device, capturing the image shown on the reference plane to generate a reference image information, and capturing the image shown on the surface of the object to generate an object image information; and a processing module, coupled to the image capture device for obtaining the reference image information and the object image information, calculating a plurality of brightness relationships between each of the speckles and adjacent speckles rounding each speckle in the reference image information and the object image information, and using a predetermined formula to calculate the brightness of each of the speckles and adjacent speckles rounding each speckle, in order to obtain a relative brightness information of each of the speckles, so as to calculate the distance between the distance measurement system and the object according to the relative brightness information;

wherein the predetermined formula is a value, which is obtained by dividing the brightness of each speckle by a summation of the brightness of each speckle and the average of brightness of each speckle and adjacent speckles rounding each speckle.

2. The distance measurement system as claimed in claim 1, wherein the light source module comprises a planar light source module.

3. The distance measurement system as claimed in claim 1, wherein the light source module comprises:
   a laser light source, providing a laser beam; and
   a diffusion component, disposed in a transmission path of the laser beam to perform the light beam having the speckle pattern.

4. The distance measurement system as claimed in claim 1, wherein the image capture device comprises a camera or a charge coupling device.

5. A distance measurement method, comprising:
   projecting a light beam having a speckle pattern to at least one reference plane, so as to show a plurality of images having the speckle pattern on the at least one reference plane, wherein the speckle pattern has a plurality of speckles;
   capturing the image having the speckle pattern on the at least one reference plane to obtain at least one reference image information;
   capturing an image having the speckle pattern on a surface of an object to obtain an object image information when the object is illuminated by the light beam;
   calculating a plurality of brightness relationships between each of the speckles and adjacent speckles rounding each speckle in the reference image information and the object image information, and using a predetermined formula to calculate the brightness of each of the speckles and adjacent speckles rounding each speckle, so as to obtain a relative brightness information of each speckle, the predetermined formula is a value, which is obtained by dividing the brightness of each speckle by a summation of the brightness of each speckle and the average of brightness of each speckle and adjacent speckles rounding each speckle; and
   calculating the distance between the distance measurement system and the object according to the relative brightness information.

6. The distance measurement method as claimed in claim 5, wherein the step of obtaining the relative brightness information of each speckle comprises:
   comparing brightness of each of speckles and adjacent speckles rounding each speckle, wherein each of adjacent speckles is corresponding to one of a plurality of regional binary codes respectively;
   applying 1 to one of the regional binary codes when corresponding adjacent speckle is brighter than corresponding speckle;
   applying 0 to one of the regional binary codes when corresponding adjacent speckle is darker than corresponding speckle; and
   storing regional binary codes of the adjacent speckles rounding each speckle to treat as the relative brightness information of each speckle.

7. The distance measurement method as claimed in claim 5, wherein the step of calculating the distance of the object comprises:
   comparing the relative brightness information of each of speckles in the object image information and in the reference image information, so as to obtain a plurality of similarity values; and
   calculating the distance of the object according to the similarity values.

8. The distance measurement method as claimed in claim 5, wherein the step of calculating the distance of the object comprises:
   comparing the relative brightness information of each speckle in the at least one reference image information and in other reference image information obtained from other reference planes, so as to calculate position variation of each speckle in different reference planes, and obtain at least one displacement vector of each speckle; and
   comparing the relative brightness information of each speckle in the object image information with the relative brightness information of at least one of reference image information, so as to calculate the distance of the object according to the displacement vector of each speckle.

9. A non-transitory computer readable medium storing processing software that when executed by a processor executes a program for analyzing a distance of an object in a distance measurement:
   receiving at least one reference image information from at least one image shown on at least one reference plane by reflecting a light beam having a speckle pattern, wherein the speckle pattern has a plurality of speckles;
   receiving an object image information from an image shown on a surface of an object reflecting the light beam having the speckle pattern;
   calculating brightness relationships among each of speckles and adjacent speckles rounding each speckle in the least one reference image information and the object image information, and using a predetermined formula to calculate the brightness of each of the speckles and adjacent speckles, so as to obtain a relative brightness information of each speckle, the predetermined formula is a value, which is obtained by dividing the brightness of each speckle by a summation of the brightness of each speckle and the average of brightness of each speckle and adjacent speckles rounding each speckle; and
   calculating the distance between the distance measurement system the object according to the relative brightness information.

10. The non-transitory computer readable medium of claim 9, wherein the step of obtaining the relative brightness information of each speckle comprises:
   comparing brightness of each of speckles and adjacent speckles rounding each speckle, wherein each of adjacent speckles rounding each speckle is corresponding to one of a plurality of regional binary codes respectively;

applying 1 to one of the regional binary codes when corresponding adjacent speckle is brighter than corresponding speckle;

applying 0 to one of the regional binary codes when corresponding adjacent speckle is darker than corresponding speckle; and storing regional binary codes of the adjacent speckles rounding each speckle to treat as the relative brightness information of each speckle.

11. The non-transitory computer readable medium of claim 10, wherein the step of calculating the distance of the object comprises:

comparing relative brightness information of each of speckles in the object image information and in the reference image information, so as to obtain a plurality of similarity values; and calculating the distance of the object according to the similarity values.

12. The non-transitory computer readable medium of claim 10, wherein the step of calculating the distance of the object comprises:

comparing the relative brightness information of each speckle in the at least one reference image information and in other reference image information obtained from other reference planes, so as to calculate position variation of each speckle in different reference planes, and obtain at least one displacement vector of each speckle; and comparing the relative brightness information of each speckle in the object image information with relative brightness information of at least one of reference image information, so as to calculate the distance of the object according to the displacement vector of each speckle.

* * * * *